United States Patent
Crocomo et al.

(10) Patent No.: US 8,222,843 B2
(45) Date of Patent: Jul. 17, 2012

(54) METHOD FOR DETERMINING THE ANGULAR POSITION OF THE ROTOR OF A MECHANICALLY COMMUTATED D.C. SERVO MOTOR

(75) Inventors: Leandro Crocomo, Botucato (BR); Wolfgang Köllner, Vienna (AT); Roman Morawek, Vienna (AT); Alexandre Pozzer, Campinas (BR)

(73) Assignee: Continental Automotive GmbH, Hannover (DE)

( * ) Notice: Subject to any disclaimer, the term of this patent is extended or adjusted under 35 U.S.C. 154(b) by 405 days.

(21) Appl. No.: 12/445,971

(22) PCT Filed: Oct. 16, 2007

(86) PCT No.: PCT/EP2007/061036
§ 371 (c)(1),
(2), (4) Date: Apr. 17, 2009

(87) PCT Pub. No.: WO2008/046829
PCT Pub. Date: Apr. 24, 2008

(65) Prior Publication Data
US 2010/0315032 A1  Dec. 16, 2010

(30) Foreign Application Priority Data
Oct. 18, 2006  (DE) .......................... 10 2006 049 123

(51) Int. Cl.
*G05D 3/12* (2006.01)
(52) U.S. Cl. ........... 318/254.1; 318/400.17; 318/400.23; 318/701
(58) Field of Classification Search .................. 318/254, 318/400.17, 400.23, 701, 439
See application file for complete search history.

(56) References Cited

U.S. PATENT DOCUMENTS

| | | | | |
|---|---|---|---|---|
| 5,963,001 A * | 10/1999 | Peter et al. | ..................... | 318/563 |
| 6,657,407 B2 | 12/2003 | Lutter et al. | | |
| 7,064,509 B1 * | 6/2006 | Fu et al. | ................... | 318/400.23 |
| 7,248,007 B2 * | 7/2007 | Svobodnik | ............... | 318/400.01 |
| 2003/0102831 A1 | 6/2003 | Lutter et al. | | |
| 2004/0054248 A1* | 3/2004 | Kimchy et al. | ................... | 600/3 |

FOREIGN PATENT DOCUMENTS

| | | |
|---|---|---|
| DE | 3824811 A1 | 1/1990 |
| DE | 4304690 C1 | 8/1994 |
| DE | 4327033 A1 | 2/1995 |
| DE | 4444762 A1 | 6/1996 |
| DE | 19544207 A1 | 6/1997 |
| DE | 10028037 A1 | 12/2001 |

* cited by examiner

*Primary Examiner* — Walter Benson
*Assistant Examiner* — Bryan Gordon
(74) *Attorney, Agent, or Firm* — King & Spalding L.L.P.

(57) ABSTRACT

Method for determining the angular position of the rotor of a mechanically commutated DC servo motor (5), which is arranged in the transverse branch of a bridge circuit, and the armature current of which is preset by an electromechanically activated switching device (28), —with a control and analysis unit (17) which analyzes the current ripple (3) present in the armature current (2) and attributable to the mechanical commutation, characterized in that—from each switch contact (6, 7) of the switching device (28), a contact-voltage feedback signal (9, 10) is fed back to the control and analysis device (17) by means of a feedback circuit (20), and in that the control and analysis unit (17), by using the at least one contact-voltage feedback signal (9, 10), determines a contact vibration time interval (4) and performs an estimate of current ripple (3) during this contact vibration time interval (4), during which an analysis of the current ripple due to contact vibrations which are caused by a switching process of at least one of the switch contacts (6, 7) is not possible.

20 Claims, 3 Drawing Sheets

$R_{tot} = R || 2R = 2/3 R$   $R_{tot} = R || R = 1/2 R$

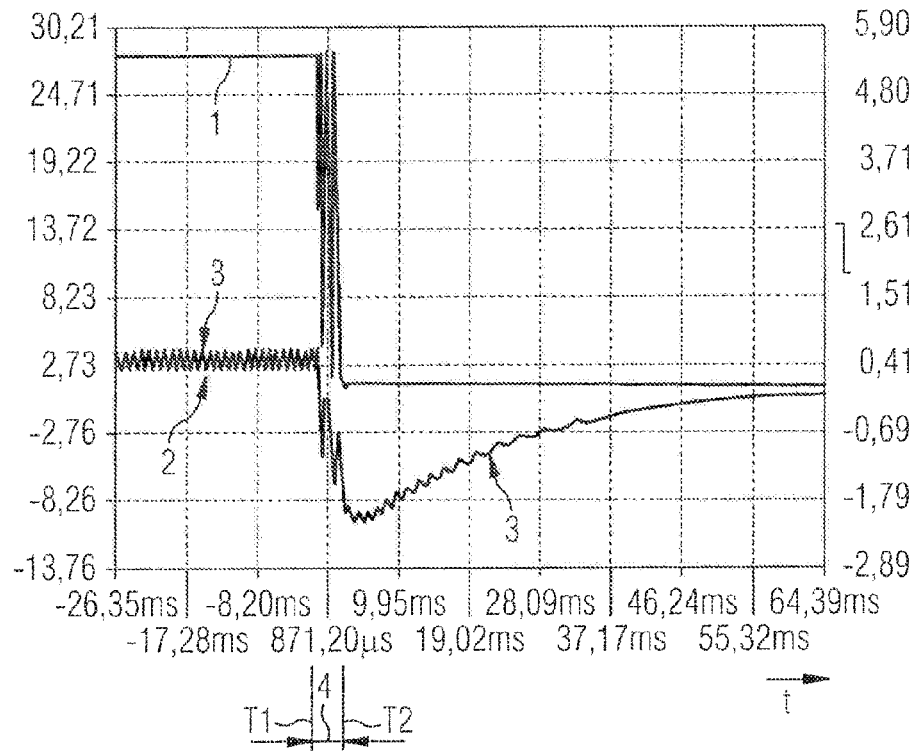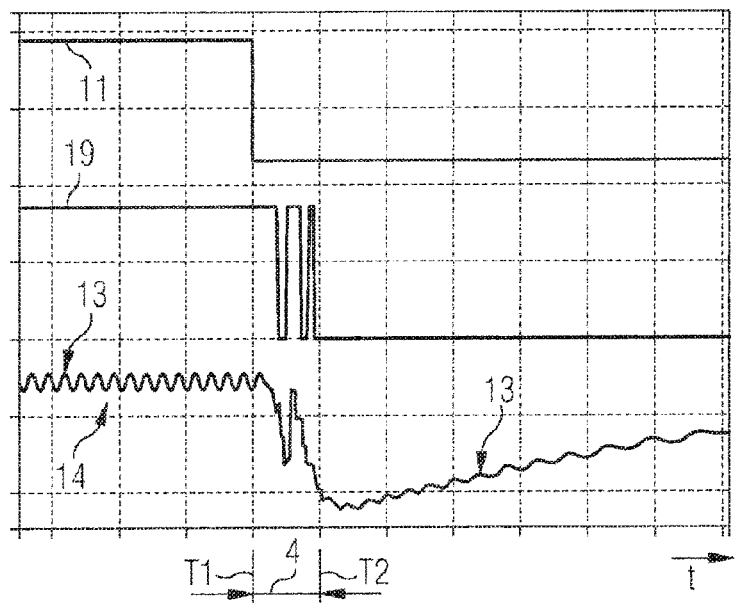

FIG 5
Braking
FIG 6
Run-up
FIG 7
Reversing
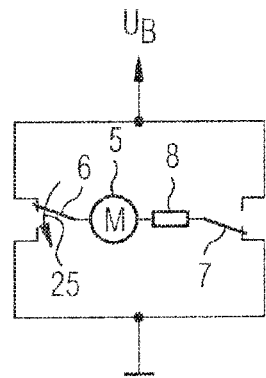
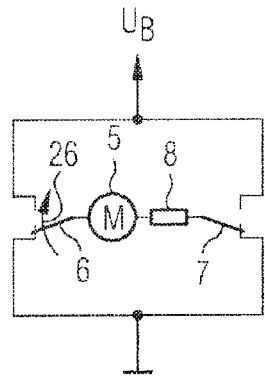
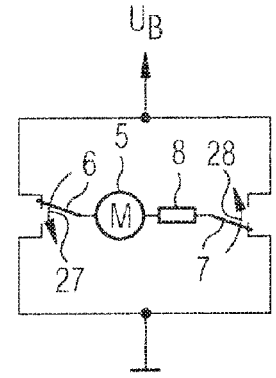
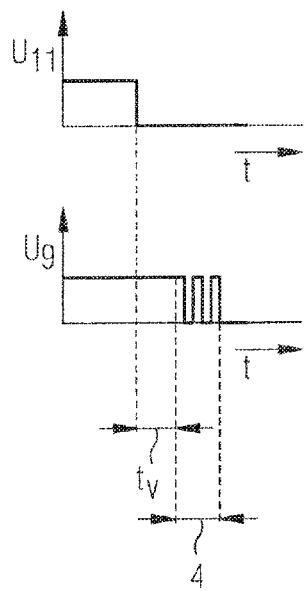
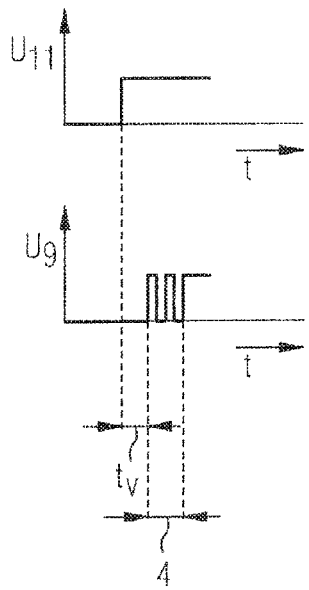
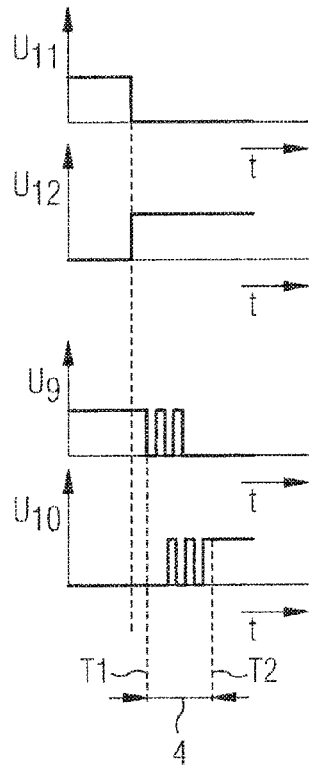

METHOD FOR DETERMINING THE ANGULAR POSITION OF THE ROTOR OF A MECHANICALLY COMMUTATED D.C. SERVO MOTOR

TECHNICAL FIELD

The invention relates to a method for determining the angular position of the rotor of a mechanically commutated d.c. servo motor, whose armature current is preset by a switching state of an electromechanically actuated switch contact, with a current ripple, present in the armature current and attributable to the mechanical commutation, being analyzed by a control and analysis unit.

PRIOR ART

For servo drives, such as used in vehicles, for example for operating window lifters and sunroofs, mechanically commutated d.c. servo motors are used. The d.c. servo motor is arranged in a circuit in a shunt arm of a bridge circuit in which two switching contacts of a relay, controlled by a microcontroller, preset the direction of the motor current. In order to limit the closing force during a closing operation, the current position of the closing part must be known by the microcontroller.

It is known that the rotor position can be directly determined by analyzing the armature fluctuations, which are caused by the mechanical commutating operation. For example, if a brush slides over two adjacent collector segments the ohmic resistance changes briefly (FIG. 1). This causes the d.c. component of the armature current to be superimposed by an a.c. component. If the number of poles of the d.c. motor is known, the extent of this current ripple, also referred to in the following as armature current ripple, can be determined and from this the angular position of the rotor. The amount of current ripple, also known as the ripple count, can be determined in the microcontroller using known maxima-minima algorithms. In this way, the current rotor position or, from the frequency of the current ripple, the rotational speed can be easily calculated while a drive is running. A method of this kind is, for example, known from DE 38 24 811 A1.

In operating phases in which the d.c. servo motor is started, braked or its operation is reversed, a determination of the current ripple is, however, difficult because contact or relay bounce occurs during the switchover of the mechanical contacts. During a time segment, referred to in the following as a contact bounce time interval, the armature current signal is disturbed and a direct analysis of the current ripple is not possible. In practice, this contact vibration time interval can last several ms. It depends on various operating circumstances, including ageing of the relay. With an electrically operated motor vehicle window lifter or sunroof, the zero position can shift because of this effect, which is further aggravated by backlash in the drive train. If, however, a closing operation of a window or sunroof starts from a position which is associated with imprecision, then in the event of jamming this can cause the maximum permissible closing force to be exceeded. Due to the inexact information with regard to the position, injuries can occur due to the trapping of body parts. To prevent this, the servodrive has to be frequently initialized, which is disadvantageous.

PRESENTATION OF THE INVENTION

The object of the invention is to provide a method for the determination of the angular position of the rotor of a mechanically commutated d.c. servo motor, by means of which a determination of the rotor position, which is based exclusively on an analysis of the armature current ripple present in the armature current, is possible with greater accuracy.

The object is achieved by a method with features of claim 1. Advantageous embodiments of the invention are the subject matter of dependent claims.

A basic concept of the invention is to carry out an analysis of the current ripple on the basis of a metrologically determined contact bounce time interval, during a time interval in which an analysis of the current ripple based on disturbances in the armature current signal is not possible. The rotor position can be determined with greater accuracy by this adaptation of the analysis process to the actual bounce time of a changeover relay. During the programming of an analysis algorithm, it is not necessary to use an a-priori probability of a worst-case (longest) bounce time as a basis, but instead the analysis time adapts to the ageing and to the prevailing operating status of the changeover relay. In other words, the imprecision of an analysis process, which is naturally present, is used according to the invention only as long as it is actually necessary. This improves the positional accuracy.

During a closing operation more accurate information on the position, and therefore also on the starting position, of the closing part is present. The effect of a jamming protection of a motor-driven closing part is therefore improved. This advantage is decisive, especially for a window lifter in the area of approximately 4 mm before entry into the frame seal. Thanks to the invention, the risk of injury can be largely minimized in this case. On the other hand, a secure closure is also achieved.

A further essential advantage can be seen in that the cumulative error when determining the position is less even during frequent changes in direction of rotation and where there is backlash in the drive train. This means that the drive system needs to be initialized less frequently. The consequence of this is that the availability of the system is increased because, unlike previously, it is not necessary to limit various functions, such as the automatic operation of a window lifter, due to accumulative errors.

The inventive method is characterized in that a contact voltage feedback signal, derived from a switching contact in each case, is fed back from each switching contact of an electromechanically actuated switching device to the control and analysis unit by means of a feedback circuit. From this information, the control and analysis unit determines a contact vibration time interval in which an analysis of current ripple is not possible due to disturbance. The control and analysis device therefore carries out an estimation of the current ripple during this time period according to this contact vibration time interval.

A preferred embodiment is characterized in that the switching device is formed by a changeover relay with a first switching contact and a second switching contact, with a first contact feedback signal from the first switching contact and a second contact feedback signal from the second switching contact being fed back to the control and analysis unit. Furthermore, the control and analysis unit can detect bounce of different lengths during a reversal of a motor, during which two switching contacts are essentially switched simultaneously. It is therefore ensured that a ripple count is only determined if the armature current signal is not distorted by contact vibrations.

In a preferred embodiment of the inventive method, it can be provided that a start time point and an end time point of the contact vibration time interval can be determined either from the first contact voltage feedback signal or from the second contact voltage feedback signal. In this way, in the event of a braking operation or a run-up, during which only one switching contact in the bridge branch is switched, the analysis process can be adapted to the actual bounce time of this one relay contact.

In a further preferred embodiment, it can be provided that a start time point can be determined from a control signal generated by the control and analysis unit and fed back to the switching device and an end time point of the contact vibration time interval can be determined from a first or second contact voltage feedback signal assigned to this time signal. The advantage of this is that only the end of the contact vibration time interval has to be measured, with the start being preset by the control system. In this way, the analysis is simpler overall but this is at the cost of accuracy because the analysis process is also used during the response time of a relay, but in this case an evaluation, i.e. counting, of the current ripple would still be possible.

With regard to the realization of the invention, it can be advantageous if the control and analysis unit is a microcontroller or microcomputer containing an analysis algorithm.

The accuracy of the position determination can be further improved if the analysis algorithm, as an extension to a stored drive model, can also take account of the rotational speed of the rotor before the changeover of a switching contact.

A feedback circuit, which is often already present in existing motor vehicle servodrives for monitoring relay contacts, is advantageous. A change to the hardware is not necessary.

A feedback circuit which is essentially formed by ohmic voltage dividers is especially cost-effective.

BRIEF DESCRIPTION OF DRAWINGS

For a further explanation of the invention, reference is made in the following part of the description to the drawings, which show further advantageous embodiments, details and developments of the invention. The drawings are as follows:

FIG. 3 A measurement diagram whose top curve shows the voltage at the switch contact of the changeover relay in FIG. 3 and whose bottom curve shows the armature current of the commutator motor which is being braked by a short-circuit braking;

FIG. 4 A digitized pattern of the measured variables according to FIG. 3;

FIG. 5 A switching sketch and a schematic diagram showing the inventive method during a braking operation;

FIG. 6 A switching sketch and a schematic diagram to explain the inventive method during a run-up operation;

FIG. 7 A switching sketch and schematic diagram showing the inventive method during a reversing operation.

IMPLEMENTATION OF THE INVENTION

Figure 1:
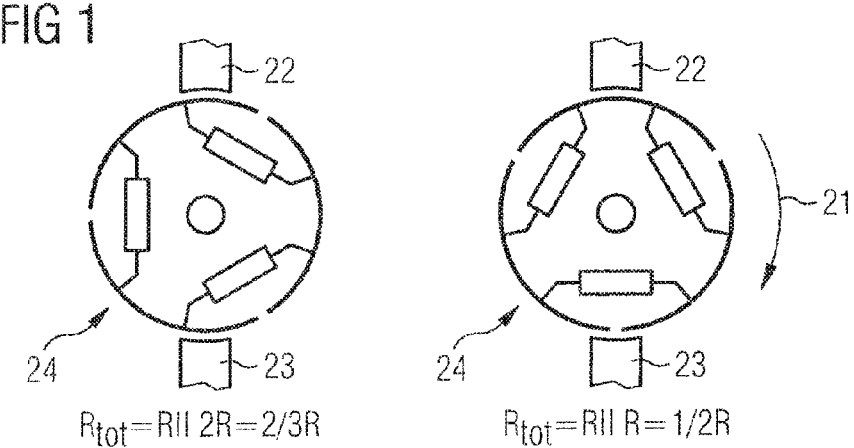
FIG. 1 A schematic diagram showing the armature current ripple caused by mechanical commutation.

FIG. 1 is a schematic representation showing the resistance relationships during a mechanical commutation operation of a d.c. motor. The collector 24 consists of three collector segments. The armature coils are shown by three ohmic resistors. As can be seen from the left-hand sketch in FIG. 1, an ohmic resistor, formed by a parallel circuit, is positioned between both brushes 22, 23, with the left-hand resistor being positioned in parallel with two resistors arranged in series. During a rotation of the collector (arrow 21), which is shown in the right-hand part of FIG. 1, the bottom brush 23 passes over two adjacent collector segments. This briefly causes a short circuit between these adjacent collector segments. The ohmic resistance between both brushes 22, 23 in this time instant is formed by a parallel circuit consisting of two coil resistors. This change in resistance is accompanied by the armature current ripple mentioned in the introduction, so that the rotor position can be determined by counting the current ripple.

Figure 2:
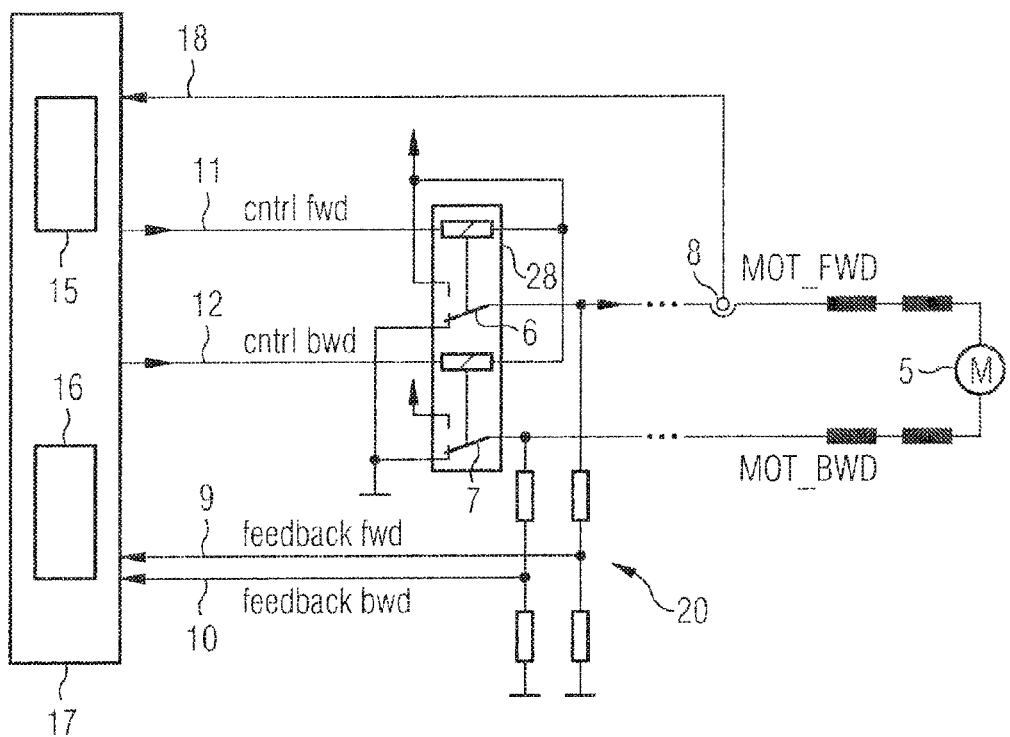
FIG. 2 A simplified circuit diagram of a control circuit for a servo motor in a bridge circuit, with the inventive method being implemented in the control and analysis unit shown in the drawing.

FIG. 2 shows a simplified circuit diagram of a servo drive, such as is used, for example, for electrically operated window lifters or sunroofs of motor vehicles. A control and analysis unit 17, in this case a microcontroller, controls a changeover relay 6, 7 by means of signals 11, 12. The direction of the armature current 2 of the motor 5 in the shunt arm of the bridge circuit is preset depending on the position of switching contacts 6 or 7. The armature current 2 is detected by a shunt 8. The measurement signal occurring at shunt 8 is fed back to the microcontroller 17 as a current feedback signal 18. A ripple counting device 15, which analyzes the current ripple present in the armature current 2, is implemented in the microcontroller 17. In the present example, the analysis takes place by means of an algorithm which counts the relative maxima and minima respectively.

Because it is not possible to analyze the armature current ripple 3 during the bounce time of the electromechanically actuated switching contact 6 or 7, a ripple analysis device 16 is provided in the microcontroller 17. This ripple analysis device 16 includes an analysis algorithm which analyzes the current ripple during the contact bounce phase. In addition to drive parameters, the analysis algorithm uses the most recent valid rotational speed of the rotor.

To minimize the error due to the analysis, the analysis time is not preset but is instead matched to the actual contact vibration time. A feedback circuit 20, which consists essentially of two ohmic voltage dividers and feedback lines 9 and 10, is used to determine this actual contact vibration time. The contact voltage signal of the changeover contacts 7 or 6 respectively is fed back to the microcontroller 17 through these feedback lines 9 and 10. This enables the microcontroller 17 to determine the bounce time of one or both contacts 6, 7. Based on this information, the analysis algorithm is used only for as long as it is actually necessary, i.e. until the ripple present in the armature signal is no longer useable. During a short-circuit braking, during which one of the contacts 7, 6 switches, the analysis time lasts until the bounce time of the switching contact (either 6 or 7) has decayed. During a reversing operation, during which both contacts 7, 6 are switched at the same time, the analysis time lasts until each of contacts 7, 6 has come to rest. Only then does an analysis of the current ripple present in the armature current 2 again take place (see FIG. 7).

In practice, the feedback circuit 20 is often already present in motor vehicle servo drives and is used to monitor the "sticking" of the switching contacts 6, 7. In this case, the realization of the invention requires only a suitable software (17, 16) of the microcontroller 17.

FIG. 3 shows, as a measurement diagram, the electrical voltage 1 at the switching contact 6 and the armature current 2 as a function of time t. During a changeover phase, a changeover of the contact 6 from battery voltage to ground takes place (FIG. 2). This corresponds to a short-circuit braking of the motor 5 whose armature current initially changes its direction in order to then die away. The measurement curve of the armature current 2 clearly shows regularly recurring armature current ripple 3 before the changeover phase 4. Also after the changeover phase 4, the ripple 3 present in the armature current 2 can be very clearly seen. In this case, however, the motor runs down and the frequency of the current ripple 3 reduces with advancing time. Between time points T1 and T2—the bounce time of the mechanical contact 6—the pattern of the ripple present in the armature current 2 is barely analyzable.

FIG. 4 shows the digitized pattern of the changeover. Reference character 11 represents the time characteristic of the control signal, which acts on the relay coil of the switching contact 6. Below this, reference character 19 shows the digitized pattern of the contact voltage feedback signal 9. Reference character 14 represents the digitized pattern of the motor current 2. The digitized current ripple 13 can be easily detected by the ripple counter device 15 up to time point T1 and even after T2 counting of the ripple current is still quite possible. However, the current ripple cannot be detected during the transition phase 4. During interval 4 counting does not take place, but the current ripple is analyzed instead. The ripple analysis device 16 continues the analysis only until the end of the bounce time at time point T2 is detected. From time point T2, the analysis of the digitized current ripple 13 is again carried out by the ripple counting device 15. Because the time segment during which the analysis algorithm is used does not have to be preset by the maximum bounce time given in the data sheet of the changeover relay but is instead adapted to the actual switching conditions of the changeover relay, the rotor position can be determined with improved accuracy.

The contact vibration time interval 4 during braking, during run-up and during reversal of the commutator motor is shown in the drawings in FIG. 5, FIG. 6 and FIG. 7 and is explained in more detail in the following by means of a pulse diagram.

FIG. 5 shows short-circuit braking. As can be seen from the circuit diagram at the top of FIG. 5, the switching contact 6 is switched in the direction of the arrow 25. By means of this switching operation, the running d.c. motor 5 is short-circuited via the shunt 8 and the lower part of the half bridge. Because of the bounce of the switching contact 6 an analysis of the current ripple at shunt 8 is not possible during the contact vibration time interval 4. During time interval 4, the angle of rotation, through which the rotor passes in this time segment, is analyzed according to the invention. As shown in the pulse diagram of the contact voltage feedback signal U9, the analysis time (contact vibration time interval 4) begins, following a delay time tV, after the falling edge of the control voltage U11.

FIG. 6 shows a run-up of the d.c. motor 5. In this case, the d.c. motor 5 is switched from shutdown to the supply voltage UB by the changeover of switching contact 6 (arrow 26). The contact vibration time interval 4 in this case also follows the rising edge of the control voltage U11 with a time delay tV.

FIG. 7 shows a reversing operation. In this case, the motor 5 is switched by the changeover of the switching contacts 6 and 7 from running in one direction of rotation to running in the opposite direction of rotation (arrow 27, arrow 29). The bounce of the switching contact 6 (contact voltage feedback signal U9) or the bounce of the switching contact 7 (contact voltage feedback signal 10) takes place with a time delay relative to the falling or rising edge of the control voltage U11 or of the control voltage U12. In this example of the reversal of the direction of rotation the start of the contact time vibration time interval 4 is preset by the first contact vibration at the switching contact 6 and the end of the contact vibration time interval 4 is determined from the last contact vibration at switching contact 7. By measuring the time interval 4, it is ensured that an analysis of the current ripple does not take place during the indifferent phase (time interval T1 to T2), in which either the switching contact 6 or switching contact 7 bounces and the ripple count cannot take place until the ripple in the rotor current is again representative of the angle of rotation.

By means of the inventive method, the risk of an incorrect counting is reduced and the accuracy of the rotor position determination increased not only during run-up and braking but also during reversing.

LIST OF REFERENCE CHARACTERS

1 Voltage at a changeover contact
2 Armature current
3 Armature current ripple, measured commutating ripple
4 Contact vibration time interval
5 D.C. motor
6 Switching contact
7 Switching contact
8 Shunt
9 Contact voltage feedback signal
10 Contact voltage feedback signal
11 Control signal
12 Control signal
13 Armature current ripple, digitized commutating ripple
14 Armature current, digitized
15 Ripple counting device
16 Ripple analysis device
17 Control and analysis unit, microcontroller
18 Current feedback signal
19 Contact voltage feedback signal, digitized
20 Feedback circuit
21 Arrow
22 Brush
23 Brush
24 Collector
25 Arrow
26 Arrow
27 Arrow
28 Switching device, changeover circuit
29 Arrow
U9 Fed back contact voltage
U10 Fed back contact voltage
U11 Control voltage
U12 Control voltage
T1 Time point
T2 Time point
tV Delay (response time of the relay)

The invention claimed is:

1. A method for determining the angle of rotation of a rotor of a mechanically commutated direct current (DC) servo motor, which is arranged in the shunt arm of a bridge circuit and whose armature current is preset by an electromechanically actuated switching device having at least one switching contact, comprising:
   analyzing the current ripple present in the armature current and attributable to the mechanical commutation by a control and analysis unit,
   initiating a switching operation of at least one of the switching contacts to start, brake, or reverse operation of the motor, wherein the switching operation of the at least one switching contact causes a switching contact vibration time interval during which the armature current is disturbed,
   sending a switching contact voltage feedback signal to the control and analysis unit via a feedback circuit from each of the at least one switching contact of the switching device, and
   determining by the control and analysis unit a start time and an end time of the switching contact vibration time interval caused by the switching operation of the at least one switching contact using the at least one switching contact voltage feedback signal, counting the current ripple for a duration leading up to and stopping at the determined start point of the switching contact vibration time interval, and again for a duration starting at the determined end point of the switching contact vibration time interval, but not for the duration during the switching contact vibration time interval, and estimating the current ripple during the switching contact vibration time interval, based at least on the determined start point and end point of the switching contact vibration time interval.

2. The method according to claim 1, wherein
the switching device is formed by a changeover relay with a first switching contact and a second switching contact,
the first switching contact communicates a first switching contact voltage feedback signal back to the control and analysis unit, and
the second switching contact communicates a second switching contact voltage feedback signal back to the control and analysis unit.

3. The method according to claim 2, wherein the start time of the contact vibration time interval is determined based on the first switching contact voltage feedback signal and the end time of the contact vibration time interval is determined from the second switching contact voltage feedback signal.

4. The method according to claim 2, wherein the start time and the end time of the contact vibration time interval are determined either from the first switching contact voltage feedback signal or from the second switching contact voltage feedback signal.

5. The method according to claim 2, wherein a start time is determined from a control signal generated by the control and analysis unit and fed to the switching device and an end time of the contact vibration time interval is determined from one of the first or second switching contact voltage feedback signals that is assigned to this control signal.

6. The method according to claim 1, wherein the analysis of the current ripple is carried out by an analysis device, which includes an analysis algorithm, contained in the control and analysis unit.

7. The method according to claim 6, wherein the running of the analysis algorithm is activated by the change in the switching state of at least one switching contact and is used during the analysis as a parameter of a rotational speed that was determined before the switching operation.

8. The method according to claim 1, wherein the control and analysis unit samples each switching contact voltage feedback signal at periodic time intervals.

9. The method according to claim 1, wherein a current feedback signal, which is tapped off at a shunt, is supplied to the control and analysis unit.

10. The method according to claim 1, wherein the control and analysis unit samples each switching contact voltage feedback signal at periodic time intervals of less than 200 microseconds.

11. A system for determining the angle of rotation of a rotor of a mechanically commutated direct current (DC) servo motor, which is arranged in the shunt arm of a bridge circuit and whose armature current is preset by an electromechanically actuated switching device having at least one switching contact, the switching device configured to initiate a switching operation of at least one of the switching contacts to start, brake, or reverse operation of the motor, wherein the switching operation of the at least one switching contact causes a switching contact vibration time interval during which the armature current is disturbed, the system comprising:

a control and analysis unit, which analyzes the current ripple present in the armature current and attributable to the mechanical commutation, and
a feedback circuit configured to send a switching contact voltage feedback signal to the control and analysis unit from each of the at least one switching contact of the switching device,
wherein the control and analysis unit is operable to:
determine a start time and an end time of the switching contact vibration time interval using the at least one switching contact voltage feedback signal,
count the current ripple for a duration leading up to and stopping at the determined start point of the switching contact vibration time interval, and again for a duration starting at the determined end point of the switching contact vibration time interval, but not for the duration during the switching contact vibration time interval, and
estimate the current ripple during this the switching contact vibration time interval, based at least on the determined start point and end point of the switching contact vibration time interval.

12. The system according to claim 11, wherein
the switching device is formed by a changeover relay with a first switching contact and a second switching contact,
the first switching contact communicates a first switching contact voltage feedback signal back to the control and analysis unit, and
the second switching contact communicates a second switching contact voltage feedback signal back to the control and analysis unit.

13. The system according to claim 12, wherein the start time of the contact vibration time interval is determined based on the first switching contact voltage feedback signal and the end time of the contact vibration time interval is determined from the second switching contact voltage feedback signal.

14. The system according to claim 12, wherein the start time and the end time of the contact vibration time interval are determined either from the first switching contact voltage feedback signal or from the second switching contact voltage feedback signal.

15. The system according to claim 12, wherein a start time is determined from a control signal generated by the control and analysis unit and fed to the switching device and an end time of the contact vibration time interval is determined from one of the first or second switching contact voltage feedback signals that is assigned to this control signal.

16. The system according to claim 11, comprising an analysis device operable to determine the current ripple, which includes an analysis algorithm, contained in the control and analysis unit.

17. The system according to claim 16, wherein the running of the analysis algorithm is activated by the change in the switching state of at least one switching contact and is used during the analysis as a parameter of a rotational speed that was determined before the switching operation.

18. The system according to claim 11, wherein the control and analysis unit is operable to sample each switching contact voltage feedback signal at periodic time intervals.

19. The system according to claim 18, wherein time intervals are less than 200 microseconds.

20. The system according to claim 11, wherein a current feedback signal, which is tapped off at a shunt, is supplied to the control and analysis unit.

* * * * *